United States Patent
Jaenisch et al.

(10) Patent No.: US 11,381,599 B2
(45) Date of Patent: Jul. 5, 2022

(54) CYBER CHAFF USING SPATIAL VOTING

(71) Applicant: Raytheon Company, Waltham, MA (US)

(72) Inventors: Holger M. Jaenisch, Toney, AL (US); James W. Handley, Toney, AL (US); Michael J. Lambert, Gainesville, VA (US); Brandon Woolley, Murphy, TX (US); William L. Cram, Addison, TX (US); Ross MacKinnon, Plano, TX (US); Mark A. Bradbury, Oak Point, TX (US); Guy G. Swope, Reston, VA (US)

(73) Assignee: Raytheon Company, Waltham, MA (US)

(*) Notice: Subject to any disclaimer, the term of this patent is extended or adjusted under 35 U.S.C. 154(b) by 4 days.

(21) Appl. No.: 16/379,154

(22) Filed: Apr. 9, 2019

(65) Prior Publication Data

US 2019/0312908 A1    Oct. 10, 2019

Related U.S. Application Data

(60) Provisional application No. 62/655,571, filed on Apr. 10, 2018.

(51) Int. Cl.
*H04L 9/40* (2022.01)
*G06F 21/78* (2013.01)
(Continued)

(52) U.S. Cl.
CPC ........ *H04L 63/1491* (2013.01); *G06F 21/566* (2013.01); *G06F 21/78* (2013.01); *G06N 3/006* (2013.01)

(58) Field of Classification Search
CPC .......... H04L 63/1491; H04L 29/06911; G06F 21/78; G06F 21/566; G06F 21/55; G06N 3/006
See application file for complete search history.

(56) References Cited

U.S. PATENT DOCUMENTS 6,760,032 B1 * 7/2004 James ............... G06T 13/00
                                                      345/506
6,941,236 B2 * 9/2005 Huelsbergen ........ G06F 30/18
                                                      702/66

(Continued)

FOREIGN PATENT DOCUMENTS

EP             2942919 A1    11/2015
WO     WO-2019199675 A1    10/2019
(Continued)

OTHER PUBLICATIONS

"Bhattacharjee et al., A Survey of Cellular Automata: Types, Dynamics, Non-uniformity and Applications, Jul. 2016, ACM Computing Surveys,, pp. 1-24" (Year: 2016).*

(Continued)

*Primary Examiner* — Saleh Najjar
*Assistant Examiner* — Nhan Huu Nguyen
(74) *Attorney, Agent, or Firm* — Schwegman Lundberg & Woessner, P.A.

(57) ABSTRACT

A method of generating cyber chaff can include determining a cell of a grid of cells to which a first feature and a second feature of user data maps, identifying a cell type of the cell, the cell type indicating whether the cell is an active cell, an inactive cell, or a sub-process cell, and providing cyber chaff based on cyber chaff data associated with either (a) one or more cells of the inactive cell type or (b) one or more cells of the sub-process cell type.

20 Claims, 9 Drawing Sheets

(51) Int. Cl.
  *G06F 21/56*   (2013.01)
  *G06N 3/00*    (2006.01)

(56)            References Cited

U.S. PATENT DOCUMENTS

| | | | |
|---|---|---|---|
| 7,036,016 | B1 | 4/2006 | Smith, Jr. |
| 8,301,387 | B2 | 10/2012 | Hwa et al. |
| 8,516,596 | B2* | 8/2013 | Sandoval ............ H04L 63/1433 |
| | | | 726/25 |
| 8,839,417 | B1* | 9/2014 | Jordan ................ H04L 63/1491 |
| | | | 726/22 |
| 9,245,116 | B2 | 1/2016 | Evans et al. |
| 10,076,273 | B2 | 9/2018 | Berckmans et al. |
| 10,110,629 | B1* | 10/2018 | Kruse ................. H04L 63/0236 |
| 10,298,598 | B1* | 5/2019 | McClintock ........ H04L 63/1483 |
| 10,326,796 | B1* | 6/2019 | Varadarajan ........ H04L 63/1425 |
| 10,507,973 | B2 | 12/2019 | Park |
| 10,521,584 | B1* | 12/2019 | Sharifi Mehr ...... H04L 63/1425 |
| 10,929,722 | B2 | 2/2021 | Cheng et al. |
| 10,937,465 | B2 | 3/2021 | Jaenisch et al. |
| 11,036,858 | B2 | 6/2021 | Chistyakov et al. |
| 11,132,923 | B2 | 9/2021 | Jaenisch et al. |
| 2003/0084349 | A1* | 5/2003 | Friedrichs ........... H04L 63/1408 |
| | | | 726/22 |
| 2003/0115021 | A1* | 6/2003 | Mates ................. G06F 15/7842 |
| | | | 702/186 |
| 2003/0174895 | A1 | 9/2003 | Hsieh |
| 2006/0009956 | A1 | 1/2006 | Winckel et al. |
| 2006/0101516 | A1* | 5/2006 | Sudaharan .............. H04L 63/10 |
| | | | 726/23 |
| 2007/0245119 | A1 | 10/2007 | Hoppe |
| 2009/0241006 | A1 | 9/2009 | Liikanen et al. |
| 2010/0064370 | A1* | 3/2010 | Thiebeauld de la Crouee ............ |
| | | | G06F 21/79 |
| | | | 726/24 |
| 2011/0238855 | A1 | 9/2011 | Korsunsky et al. |
| 2012/0240185 | A1 | 9/2012 | Kapoor et al. |
| 2013/0145465 | A1* | 6/2013 | Wang .................. H04L 63/1491 |
| | | | 726/23 |
| 2014/0289852 | A1* | 9/2014 | Evans ..................... G06F 21/55 |
| | | | 726/23 |
| 2015/0026582 | A1* | 1/2015 | Basak .................... H04L 43/045 |
| | | | 715/734 |
| 2015/0100556 | A1 | 4/2015 | Sekiguchi et al. |
| 2015/0131796 | A1 | 5/2015 | Milsted |
| 2015/0154796 | A1 | 6/2015 | Co |
| 2015/0206315 | A1 | 7/2015 | Price et al. |
| 2015/0295907 | A1 | 10/2015 | Abrahamson |
| 2016/0321323 | A1 | 11/2016 | Gaumnitz et al. |
| 2016/0359685 | A1 | 12/2016 | Yadav et al. |
| 2016/0359876 | A1* | 12/2016 | Touboul .................... H04L 63/20 |
| 2016/0359886 | A1 | 12/2016 | Yadav et al. |
| 2017/0149787 | A1* | 5/2017 | Niemela ................. H04L 63/10 |
| 2017/0223052 | A1* | 8/2017 | Stutz .................... H04L 63/1491 |
| 2017/0257396 | A1 | 9/2017 | Shen et al. |
| 2017/0302691 | A1* | 10/2017 | Singh .................. H04L 63/1408 |
| 2017/0310690 | A1* | 10/2017 | Mestha ..................... G06N 20/00 |
| 2017/0310705 | A1* | 10/2017 | Gopalakrishna .... H04L 41/0886 |
| 2017/0327890 | A1 | 11/2017 | Saint-andre et al. |
| 2018/0027004 | A1 | 1/2018 | Huang et al. |
| 2018/0085011 | A1 | 3/2018 | Ma et al. |
| 2018/0137277 | A1* | 5/2018 | Mestha ............... G05B 23/0227 |
| 2018/0160905 | A1 | 6/2018 | Wang et al. |
| 2018/0204111 | A1 | 7/2018 | Zadeh et al. |
| 2018/0336436 | A1* | 11/2018 | Cheng ................... G06F 16/9024 |
| 2018/0337935 | A1 | 11/2018 | Marwah et al. |
| 2019/0018375 | A1 | 1/2019 | Deshpande et al. |
| 2019/0149565 | A1 | 5/2019 | Hagi et al. |
| 2019/0180181 | A1 | 6/2019 | Lilley |
| 2019/0196746 | A1 | 6/2019 | Fujimoto et al. |
| 2019/0279112 | A1 | 9/2019 | Jaenisch et al. |
| 2019/0289034 | A1* | 9/2019 | Erez ........................ H04L 67/10 |
| 2019/0296913 | A1 | 9/2019 | Verma et al. |
| 2019/0311120 | A1 | 10/2019 | Jaenisch et al. |
| 2019/0383874 | A1 | 12/2019 | Jaenisch et al. |
| 2020/0202749 | A1 | 6/2020 | Jaenisch et al. |
| 2020/0204574 | A1 | 6/2020 | Christian |
| 2020/0272731 | A1 | 8/2020 | Jaenisch et al. |
| 2020/0273499 | A1 | 8/2020 | Jaenisch et al. |
| 2020/0326695 | A1 | 10/2020 | Jaenisch et al. |
| 2020/0362334 | A1 | 11/2020 | Regev et al. |
| 2021/0027171 | A1 | 1/2021 | Jaenisch et al. |
| 2021/0060858 | A1 | 3/2021 | Rakshit |

FOREIGN PATENT DOCUMENTS

| | | |
|---|---|---|
| WO | WO-2019199769 A1 | 10/2019 |
| WO | WO-2019199777 A1 | 10/2019 |
| WO | WO-2020172122 A1 | 8/2020 |
| WO | WO-2020172124 A1 | 8/2020 |
| WO | WO-2021016533 A1 | 1/2021 |

OTHER PUBLICATIONS

"International Application Serial No. PCT/US2019/026514, International Search Report dated Jul. 5, 2019", 5 pgs.

"International Application Serial No. PCT/US2019/026514, Written Opinion dated Jul. 5, 2019", 8 pgs.

Kamalika, Bhattacharjee, et al., "A Survey of Cellular Automata: Types, Dynamics, Non-uniformity and Applications", Arxiv.Org, Cornell University Library, 201 Olin Library Cornell University Ithaca, NY, (Jul. 8, 2016).

"International Application Serial No. PCT/US2019/026338, International Search Report dated Jun. 21, 2019", 5 pgs.

"International Application Serial No. PCT/US2019/026338, Written Opinion dated Jun. 21, 2019", 7 pgs.

"International Application Serial No. PCT/US2019/026522, International Search Report dated Jul. 8, 2019", 4 pgs.

"International Application Serial No. PCT/US2019/026522, Written Opinion dated Jul. 8, 2019", 5 pgs.

Farlow, Stanley, "The GMDH Algorithm of Ivakhnenko", The American Statistician, vol. 35, No. 4, (1981), 210-215.

Ferreira, Candida, "Gene Expression Programming in Problem Solving", Soft Computing and Industry, (2002), 635-653.

Ferreira, Candida, "Gene Expression Programming: A New Adaptive Algorithm for Solving Problems", Complex Systems, vol. 13, issue 2, (2001), 22 pgs.

Gabor, D, et al., "A Universal Non-linear filter, predictor and simulator which optimizes", The Institution of Electrical Engineers, Paper No. 3270 M, (1960), 422-435.

Ivakhnenko, A G, "Heuristic Seif-Organization in Problems of Engineering Cybernetics", Automatica, vol. 6, (1969), 207-219.

Ivakhnenko, A G, et al., "The Review of Problems Solvable by Algorithms of the Group Method of Data Handling (GMDH)", Pattern Recognition and Image Analysis, vol. 5, No. 4, (1995), 527-535.

Jaenisch, H, et al., "Generalized information fusion and visualization using spatial voting and data modeling", Society of Photo-Optical Instrumentation Engineers SPIE Proceedings vol. 8756 No. 875609, (May 2013), 16 pgs.

Jaenisch, Holger, et al., "A novel application of data modeling for extracting mathematical ontologies and relationship matrix features from text documents", SPIE Defense + Commercial Sensing, (2005), 12 pgs.

Jaenisch, Holger, et al., "A robust regularization algorithm for polynomial networks for machine learning", Proc. SPIE 8059, Evolutionary and Bio-Inspired Computation: Theory and Applications V, 80590A, (May 2011), 21 pgs.

Jaenisch, Holger, et al., "Autonomous Journaling Response Using Data Model LUTS", Proc. of SPIE vol. 7344, (2009), 11 pgs.

Jaenisch, Holger, "Converting data into functions for continuous wavelet analysis", Proceedings of SPIE—The International Society for Optical Engineering, (pp. 2-13), (2009), 13 pgs.

Jaenisch, Holger, "Data Modeling Applications in Space Science and Astronomy", PhD thesis, James Cook University (pp. 1-130 of 255 pages total), (2009), 130 pgs.

(56) References Cited

OTHER PUBLICATIONS

Jaenisch, Holger, "Data Modeling Applications in Space Science and Astronomy", PhD thesis, James Cook University (pp. 131-256 of 255 pages total), (2009), 126 pgs.
Jaenisch, Holger, et al., "Data Modeling for Change Detection of Inventory Flow and Instrument Calibration", Proceedings of SOLE, (2003), 10 pgs.
Jaenisch, Holger, et al. "Data Modeling for Fault Detection", MFPT, (2003), 10 pgs.
Jaenisch, Holger, et al., "Data Modeling for network dynamics", Proceedings of SPIE—The International Society for Optical Engineering, (2004), 12 pgs.
Jaenisch, Holger, et al., "Data Modeling for Predictive Behavior Hypothesis Formation and Testing", Proc. SPIE 6241, Data Mining, Intrusion Detection, Information Assurance, and Data Networks Security, (2006), 12 pgs.
Jaenisch, Holger, et al., "Data-modeling-enabled guidance, navigation, and control to enhance the lethality of interceptors against maneuvering targets", Proceedings of SPIE—The International Society for Optical Engineering • Mar. 2005, 13 pgs.
Jaenisch, Holger, et al., "Digital MicroArray Analysis For Digital Artifact Genomics", Cyber Sensing, (2013), 20 pgs.
Jaenisch, Holger, "Entropyology: Microarray Analysis Analogy for Digital Artifact Discrimination", Proceedings of SPIE, vol. 8359, (2012), 20 pgs.
Jaenisch, Holger, "Geospatial Feature Based Automatic Target Recognition (ATR) using data models", Proceedings vol. 7697, Signal Processing, Sensor Fusion, and Target Recognition XIX, (2010), 12 pgs.
Jaenisch, Holger, et al., "Insider Threat Detection Enabled by Converting User Applications into Fractal Fingerprints and Autonomously Detecting Anomalies", SPIE Proceedings vol. 8408, (2012), 22 pgs.
Jaenisch, Holger, et al., "Performance Comparison of the Prophecy (Forecasting) Algorithm in FFT Form for Unseen Feature and Time-Series Prediction", Proc. SPIE 8757, Cyber Sensing, (2013), 30 pgs.
Jaenisch, Holger, et al., "Shai-Hulud The quest for worm sign", Proc. SPIE 5812, Data Mining, Intrusion Detection, Information Assurance, and Data Networks Security, (2005), 9 pgs.
Jaenisch, Holger, et al., "Spatial Voting For Automatic Feature Selection, Fusion and Visualization", Proc. SPIE 8756, Multisensor, Multisource Information Fusion: Architectures, Algorithms, and Applications, (2013), 21 pgs.
Jaenisch, Holger, "Spatial Voting with Data Modeling", Sensor Fusions and its Applications, (2010), 153-178.
Jaenisch, Holger, et al., "Virtual Instrument Prototyping with Data Modeling", (2003), 15 pgs.
Oltean, Mihai, et al., "An autonomous GP-based system for regression and classi?cation problems", Applied Soft Computing 9, (2009), 49-60.
U.S. Appl. No. 16/297,202, filed Mar. 8, 2019, Machine Learning Technique Selection and Improvement.
U.S. Appl. No. 16/265,526, filed Feb. 1, 2019, Device Behavior Anomaly Detection.
U.S. Appl. No. 16/379,162, filed Apr. 9, 2019, Encryption Using Spatial Voting.
U.S. Appl. No. 16/381,179, filed Apr. 11, 2019, Behavior Monitoring Using Convolutional Data Modeling.
U.S. Appl. No. 16/522,235, filed Jul. 25, 2019, Gene Expression Programming.
U.S. Appl. No. 16/554,206, filed Aug. 28, 2019, Alternative Techniques for Design of Experiments.
U.S. Appl. No. 16/281,888, filed Feb. 21, 2019, Anomaly Detection With Reduced Memory Overhead.
U.S. Appl. No. 16/281,922, filed Feb. 21, 2019, Anomaly Detection With Adaptive Auto Grouping.
"U.S. Appl. No. 16/281,888, Examiner Interview Summary dated Aug. 10, 2020", 3 pgs.
"U.S. Appl. No. 16/281,888, Non Final Office Action dated May 19, 2020", 15 pgs.
"U.S. Appl. No. 16/281,888, Notice of Allowance dated Oct. 20, 2020", 12 pgs.
"U.S. Appl. No. 16/281,888, Response filed Aug. 18, 2020 to Non Final Office Action dated May 19, 2020", 10 pgs.
"U.S. Appl. No. 16/379,162, Non Final Office Action dated Nov. 10, 2020", 20 pgs.
"International Application Serial No. PCT/US2019/026338, International Preliminary Report on Patentability dated Oct. 22, 2020", 9 pgs.
"International Application Serial No. PCT/US2019/026514, International Preliminary Report on Patentability dated Oct. 22, 2020", 7 pgs.
"International Application Serial No. PCT/US2019/026522, International Preliminary Report on Patentability dated Oct. 22, 2020", 7 pgs.
"International Application Serial No. PCT/US2020/018570, International Search Report dated Apr. 28, 2020", 4 pgs.
"International Application Serial No. PCT/US2020/018570, Written Opinion dated Apr. 28, 2020", 7 pgs.
"International Application Serial No. PCT/US2020/018574, International Search Report dated Apr. 28, 2020", 4 pgs.
"International Application Serial No. PCT/US2020/018574, Written Opinion dated Apr. 28, 2020", 7 pgs.
"International Application Serial No. PCT/US2020/043434, International Search Report dated Oct. 16, 2020", 4 pgs.
"International Application Serial No. PCT/US2020/043434, Written Opinion dated Oct. 16, 2020", 5 pgs.
Deng, Song, et al., "Distributed intrusion detection based on hybrid gene expression programming and cloud computing in a cyber physical power system", IET Control Theory and Applications, The Institution of Engineering and Technology, GB, vol. 11, No. 11, (Jul. 14, 2017), 1822-1829.
Elsayed, Saber, et al., "Evaluating the performance of a differential evolution algorithm in anomaly detection", IEEE Congress on Evolutionary Computation (CEC), IEEE, (May 25, 2015), 2490-2497.
Holnglei, Gao, et al., "A GEP-Based Anomaly Detection Scheme in Wireless Sensor Networks", Computational Science and Engineering, CSE '09, International Conference on, IEEE, Piscataway, NJ, USA, (Aug. 29, 2009), 817-822.
"U.S. Appl. No. 16/265,526, Examiner Interview Summary dated Sep. 23, 2021", 2 pgs.
"U.S. Appl. No. 16/265,526, Non Final Office Action dated Jul. 12, 2021", 16 pgs.
"U.S. Appl. No. 16/281,922, Corrected Notice of Allowability dated Jan. 27, 2021", 2 pgs.
"U.S. Appl. No. 16/281,922, Non Final Office Action dated Sep. 2, 2021", 9 pgs.
"U.S. Appl. No. 16/379,162, Examiner Interview Summary dated Feb. 12, 2021", 2 pgs.
"U.S. Appl. No. 16/379,162, Notice of Allowance dated May 26, 2021", 11 pgs.
"U.S. Appl. No. 16/379,162, Response filed Feb. 10, 2021 to Non Final Office Action dated Nov. 10, 2020", 8 pgs.
"U.S. Appl. No. 16/379,162, Supplemental Notice of Allowability dated Aug. 18, 2021", 3 pgs.
"U.S. Appl. No. 16/381,179, Examiner Interview Summary dated Sep. 30, 2021", 2 pgs.
"U.S. Appl. No. 16/381,179, Non Final Office Action dated Jun. 25, 2021", 10 pgs.
"U.S. Appl. No. 16/381,179, Response filed Sep. 27, 2021 to Non Final Office Action dated Jun. 25, 2021", 10 pgs.
"U.S. Appl. No. 16/522,235, Non Final Office Action dated Aug. 16, 2021", 11 pgs.
"International Application Serial No. PCT/US2020/018570, International Preliminary Report on Patentability dated Sep. 2, 2021", 9 pgs.
"International Application Serial No. PCT/US2020/018574, International Preliminary Report on Patentability dated Sep. 2, 2021", 9 pgs.

(56) References Cited

OTHER PUBLICATIONS

"U.S. Appl. No. 16/265,526, Notice of Allowance dated Dec. 27, 2021", 10 pgs.
"U.S. Appl. No. 16/281,922, Response filed Oct. 11, 2021 to Non Final Office Action dated Jul. 12, 2021", 9 pgs.
"U.S. Appl. No. 16/281,922, Examiner Interview Summary dated Nov. 29, 2021", 2 pgs.
"U.S. Appl. No. 16/281,922, Response filed Dec. 2, 2021 to Non Final Office Action dated Sep. 2, 2021", 11 pgs.
"U.S. Appl. No. 16/522,235, Examiner Interview Summary dated Nov. 10, 2021", 2 pgs.
"U.S. Appl. No. 16/522,235, Final Office Action dated Nov. 30, 2021", 15 pgs.
"U.S. Appl. No. 16/522,235, Response filed Nov. 16, 2021 to Non Final Office Action dated Aug. 16, 2021", 9 pgs.

\* cited by examiner

CYBER CHAFF USING SPATIAL VOTING

RELATED APPLICATION

This application claims the benefit of priority to U.S. Provisional Patent Application Ser. No. 62/655,571, filed on Apr. 10, 2018, and titled "Cyber Chaff Using Embedded Graphics Processing Unit", which is incorporated herein by reference in its entirety.

TECHNICAL FIELD

Embodiments described herein generally relate to cyber chaff using spatial voting (SV).

BACKGROUND

Developers of computer security systems are developing ways to help ensure safety of their information technology (IT) infrastructure. Some use data stores called honeypots that attempt to counteract unauthorized use of the IT infrastructure. The honeypot usually includes data that appears to be legitimate but is actually monitored more stringently than other data. The honeypot generally includes information or a resource that might be of value to an attacker. After the attacker is detected accessing the honeypot, they can be further monitored or blocked.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Aspects of embodiments are directed to generating non-random cyber chaff. The cyber chaff can improve upon honeypots. The honeypot is described in the Background. A honeypot does not evolve or otherwise adapt to actions of a user, thus limiting the use of the honeypot. The cyber chaff of embodiments can evolve between epochs, thus making the cyber chaff more accurately emulate a response that matches expectations of an attacker.

Cyber chaff is usually generated using randomly generated data. The cyber chaff is provided to emulate a normal response to the attack, so that the attacker is not aware that the response is random or that the presence of the attacker is detected. However, this randomly generated data is easily discernible by an attacker and an attacker can quickly become aware that the response is chaff.

Embodiments provide systems, devices, and techniques that generate random-looking, yet deterministic cyber chaff. The embodiments can improve upon prior chaff systems. The improvements can include reduced memory overhead, reduced processor bandwidth required to generate and provide the cyber chaff, or the like. The improvements can include improved emulation of an actual IT infrastructure response, such as to keep an attacker on the system longer. The embodiments can improve upon honeypots and other cyber chaff systems in one or more of the aforementioned ways.

Embodiments can use a mathematically definite function or set of rules to generate a response to a user that appears as if it is from an IT infrastructure device but is an emulation of a device response. In this way, an attacker can be intercepted and caused to remain intent on their attack while the IT infrastructure learns about the attack. The knowledge gained can help aid the IT infrastructure device attack countermeasures or detect a similar attack in the future.

Figure 1:
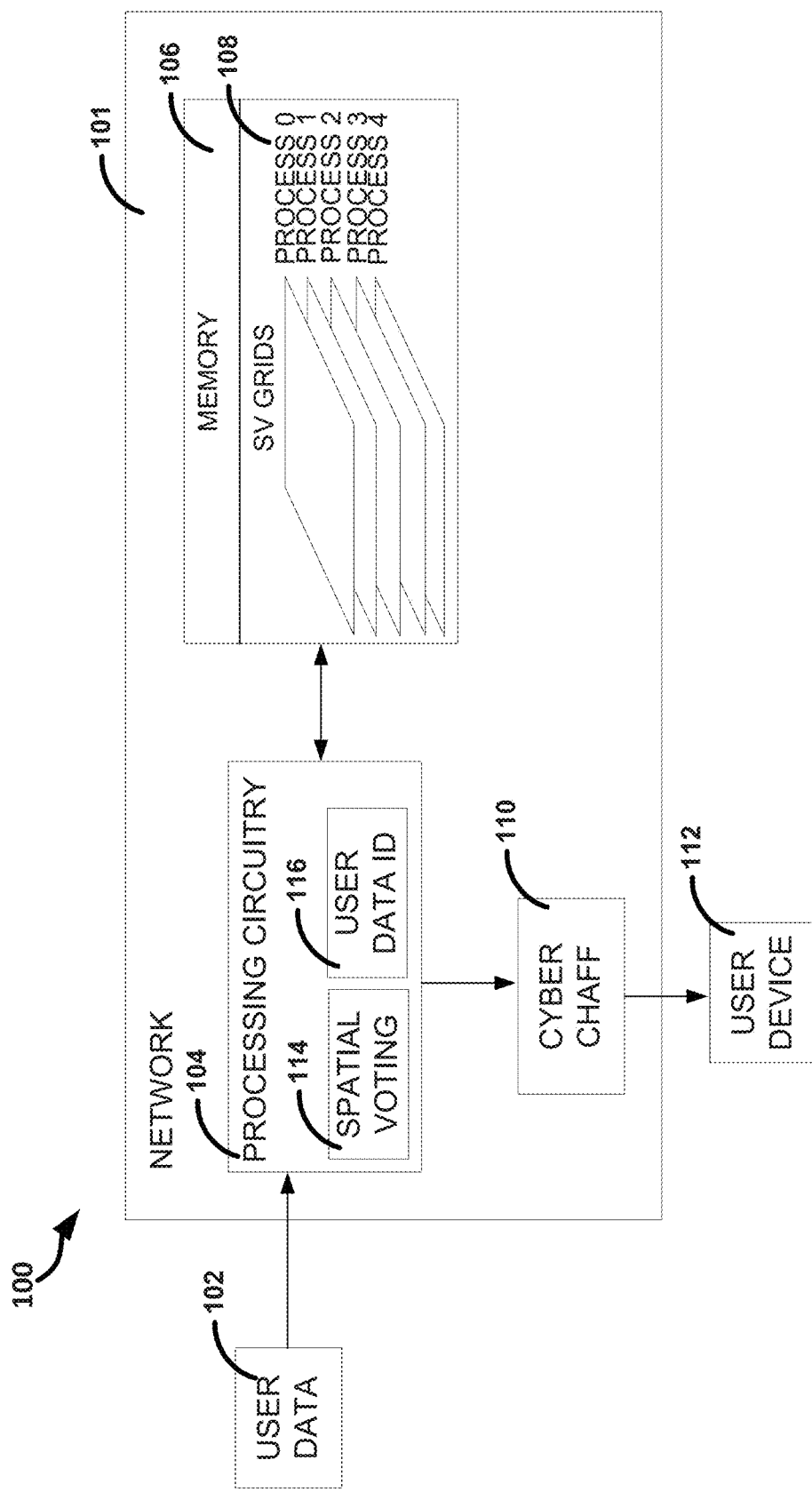
FIG. 1 illustrates, by way of example, a diagram of an embodiment of a system for generating cyber chaff.

FIG. 1 illustrates, by way of example, a diagram of an embodiment of a system 100 for generating cyber chaff. The system 100 as illustrated includes user data 102. The user data 102 is from a device, such as device 112, that is accessing or operating in a network 101. The user data 102 can include a packet, data stream, file (e.g., a document or the like), one or more bytes, number of bits, or the like. The user data 102 can include a request to read from or write to a memory of the network 101, access functionality of a device of the network 101, access a server, such as an application server, an email server, or the like, perform a query on a database, or other application. The user data 102 can be associated with a non-malicious intent or a malicious intent. SV circuitry 114 can determine whether the user data is anomalous, malicious, non-malicious, or the like. The user data 102 can be associated with a process (e.g., an application that is either a source or target of the user data 102). More details regarding the determination of the process and the determination regarding anomalous, malicious, and non-malicious, are provided elsewhere herein.

The user data 102 can be received at processing circuitry 104. The processing circuitry 104 can include hardware, software, firmware, or a combination thereof configured to generate cyber chaff 110. Note that "cyber chaff" as used herein means data related to computer devices and does not relate to metal shards, seed casings, or other non-computer-based chaff.

Hardware can include one or more electric or electronic components configured to perform one or more operations of the processing circuitry 104. The electric or electronic components can include one or more transistors, resistors, capacitors, diodes, inductors, analog to digital converters, digital to analog converters, rectifiers, power supplies, logic gates (e.g., AND, OR, XOR, negate, buffer, or the like), switches, oscillators, modulators, demodulators, relays, antennas, phase-looked-loops, amplifiers, central processing units (CPUs), graphics processing units (GPUs), application specific integrated circuits (ASICs), field programmable gate arrays (FPGAs), or the like.

The processing circuitry 104 as illustrated includes SV circuitry 114 and user data identification (ID) circuitry 116. Operations of the SV circuitry 114 are described in further detail regarding FIGS. 4-7. The SV circuitry 114, in general, maps user data 102 to a cell of a grid of cells. The SV circuitry 114 can identify, based on the cell to which the user data 102 is projected, whether the user data 102 is anomalous (never been seen before) or seen before. The SV circuitry 114 can identify whether the user data 102 is associated with malicious behavior based on an order to which input is mapped to cells of the grid of cells. For example, a known attack can have a series of associated user data 102. That data can be mapped to cells of the grid. The sequence of cells to which input is mapped can be associated with the attack. Then, in response to user data 102 mapping to the same series of cells, the attack can be detected.

The SV circuitry 114 can, for purposes of generating cyber chaff, map the user data 102 to a cell of the grid of cells. The user data ID circuitry 116 can, in series or parallel, such as before, after, or during the SV circuitry 114 determination of the cell to which the user data 102 maps, determine a type of process (e.g., application, operating system (OS), hardware access (e.g., through a kernel), data operation (e.g., forward, buffer, or the like), associated with the user data. The kernel is OS specific and communicates directly to the hardware. Common kernels or OSs include Windows from Microsoft Corporation of Redmond, Wash., United States, IoS from Apple Inc. of Cupertino, Calif., United States, Linux from various companies and opensource providers, Structured Query Language (SQL) developed by Oracle Corporation of Redwood City, Calif., United States, Android from Google, Limited Liability Company (LLC) of Mountain View, Calif., United States, or the like. The process can also be an application response of an application operating on the kernel or OS. There are numerous software applications, too many to name here. The subject matter of this application is not limited by type of software application. The user data ID circuitry 116 can identify a process associated with the user data 102. The identified process can be associated with a grid of cells to which the user data 102 is projected by the SV circuitry 114.

The processing circuitry 104 can, based on the cell from the SV circuitry 114 and the process identified by the user data ID circuitry 116, identify an SV grid of SV grids 108 in a memory 106 associated with the identified process. The processing circuitry 104 can generate cyber chaff 110 to be provided to the user device 112 in response to the user data 102. The cyber chaff 110 can be determined based on active cells, non-active cells, or sub-process cells in the SV grid for this epoch.

Figure 2:
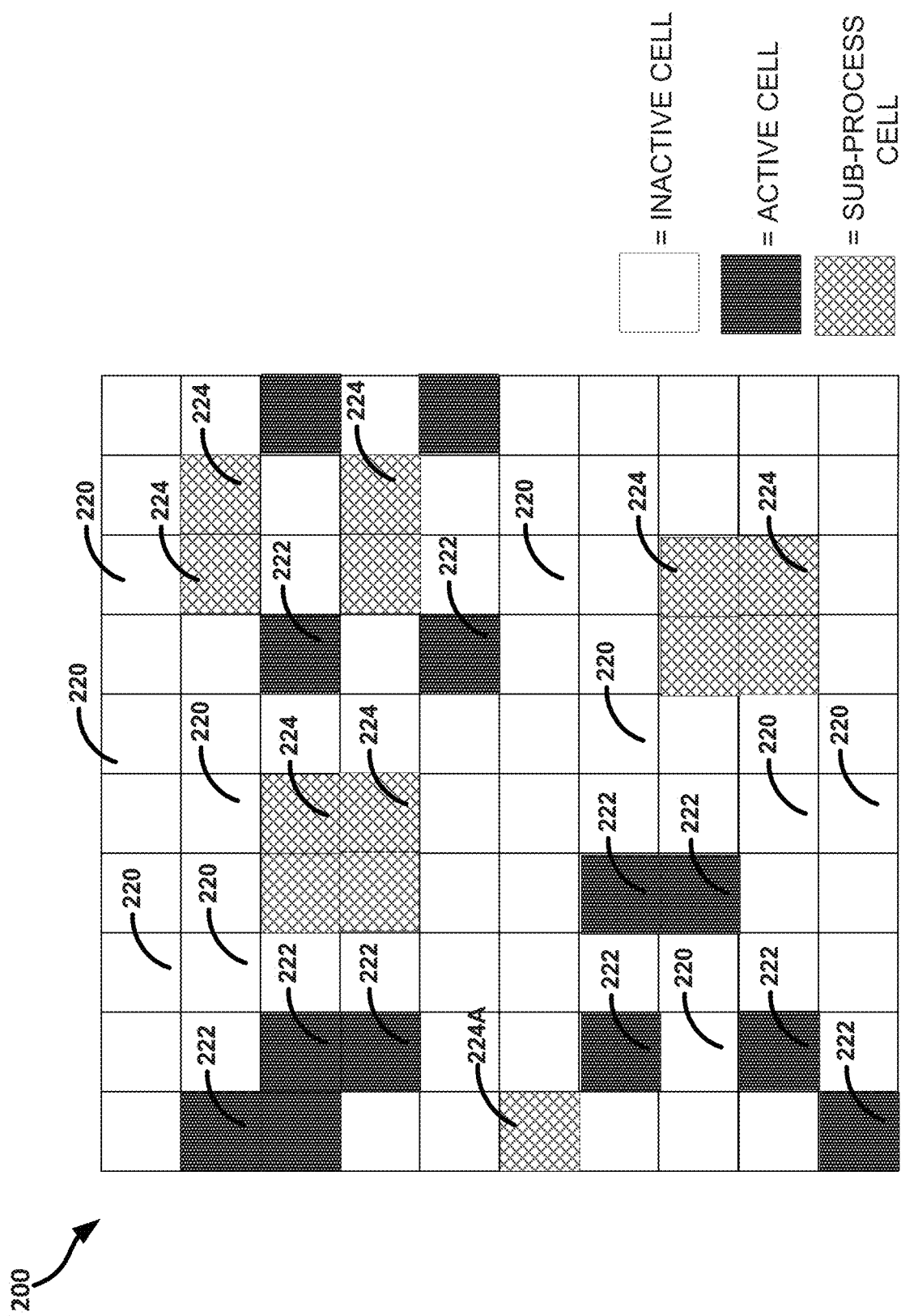
FIG. 2 illustrates, by way of example, a diagram of an embodiment of an SV grid for use in preparing the cyber chaff.

FIG. 2 illustrates, by way of example, a diagram of an embodiment of an SV grid 108 for use in preparing the cyber chaff 110. The SV process is provided in more detail in FIGS. 4-7. In short summary, the spatial voting process determines two order-dependent statistic values based on the user data 102. Each of the statistic values (sometimes called features) is mapped to an axis of an SV grid. The cell to which the statistics map is identified by the SV circuitry 114. A sub-process associated with the cell (including "unknown") can be identified. Data in activated cells of the SV grid can be used by the processing circuitry 104 to generate a response that is formatted to emulate a response from the sub-process.

The SV grid 200 is a more detailed view of one of the SV grids 108. The SV grid 200 as illustrated includes inactive cells 220, active cells 222, and sub-process cells 224. The inactive cells 220 have no effect on the data that is provided as cyber chaff, except that if the user data 102 is mapped to the inactive cell 220 a sub-process is unknown and can affect which cells are active or inactive in a future epoch.

The active cells 222 can be associated with the data that is provided in the cyber chaff 110. The data associated with the active cells 222, or a subset thereof, can be combined and provided as the cyber chaff 110. A format of the data that is provided as the cyber chaff 110 can be determined based on the sub-process cell 224 to which the user data 102 is mapped. Note that all active cells 222 and inactive cells 220 can have data associated therewith, however, only the data from the active cells 222 in a given epoch can be provided as the cyber chaff 110. The data associated with the active cells 222 and the inactive cells 220 can include a file, document, bits, bytes, or other data.

The sub-process cells 224 are associated with function calls or the like that can be performed by the process associated with the SV grid 200. For example, in a terminal, a user can change an active directory using "CHDIR", execute a process, read or write to a file, or the like. Each of the actions performed in the terminal are sub-processes of the terminal process. Sub-processes can be defined or identified for other processes.

In some embodiments, if the user data is mapped to a sub-process cell 224, data associated with active cells 222, sub-process cells 224, or a combination thereof, can be provided as the cyber chaff 110. In some embodiments, the only data associated with the sub-process cells 224 that are contiguous with (including a touching corner) the cell to which the user data is mapped is provided in response to user data mapped to one of the sub-process cells 224. The cyber chaff 110 can be formatted as defined by the sub-process of the sub-process cells 224 and provided to the user device 112.

In some embodiments, if the user data 102 is mapped to an inactive cell 220, data from the active cells 222 or a subset thereof can be provided as the cyber chaff 110. The data can be provided in a pre-defined format for when the user data 102 is mapped to the inactive cell 220. Table 1 shows an example data format for the SV grid data in the memory 106.

TABLE 1

| SV Grid Cell Data | | | | |
|---|---|---|---|---|
| SV Grid ID | Cell ID | Cell Type | Cell Data | Format Type |
| WWW | XXX | 0, 1, 2 | YYY | ZZZ |

The SV grid ID indicates the process identified by the user data ID circuitry 116. The cell ID indicates the cell of the SV grid (identified by the SV grid ID) to which the user data 102 is mapped (as determined by the SV circuitry 114). The cell type indicates whether the cell is active, inactive, or a sub-process cell. The cell data includes one or more bytes, bits, characters, files, documents, or the like to be returned if the cell is an active cell or a sub-process cell and the user data 102 is mapped to a specified cell of the SV grid. The format type indicates the format of the cyber chaff 110. The format can indicate a number and location of spaces, a location at which random data can be inserted, a location at which specific characters are to be used, and the like. The format type can be specific to a sub-process. For some sub-process cells 224, such as the cell 224A, the response to the user data 102 being mapped thereto can be static.

The data provided in response to the same user data 102 can be different for different epochs of the cyber chaff process. For example, the cells that are active can be changed at each epoch, thus possibly changing the data that is provided in the cyber chaff 110. The manner in which the cells change type (e.g., from active to inactive or vice versa) can be deterministic. The manner in which the cells change type can be determined based on some rules. An example of such rules is used in Conway's Game of Life. Conway's Game of Life is a cellular automaton. The evolution of a cell (changing of the cell type) for embodiments is deterministic and only based on an initial condition of itself and immediately surrounding cells (contiguous cells and cells that share a corner with the cell of interest). In an embodiment, the rules can be as follows:

1) any active cell with fewer than two active cell neighbors is inactive in the next epoch;

2) any active cell with two or three active cell neighbors remains active in the next epoch;

3) any active cell with more than three active cell neighbors is inactive in the next epoch; and 4) any inactive cell with exactly three active cell neighbors becomes an active cell in the next epoch.

In some embodiments, a fifth rule can include ensuring that any sub-process cells 224 remain sub-process cells. In some embodiments, sub-process cells 224 can be considered active cells 222, inactive cells 220, or ignored for purposes of applying the rules. The rules can be applied in numbered order or simultaneously.

Figure 3:
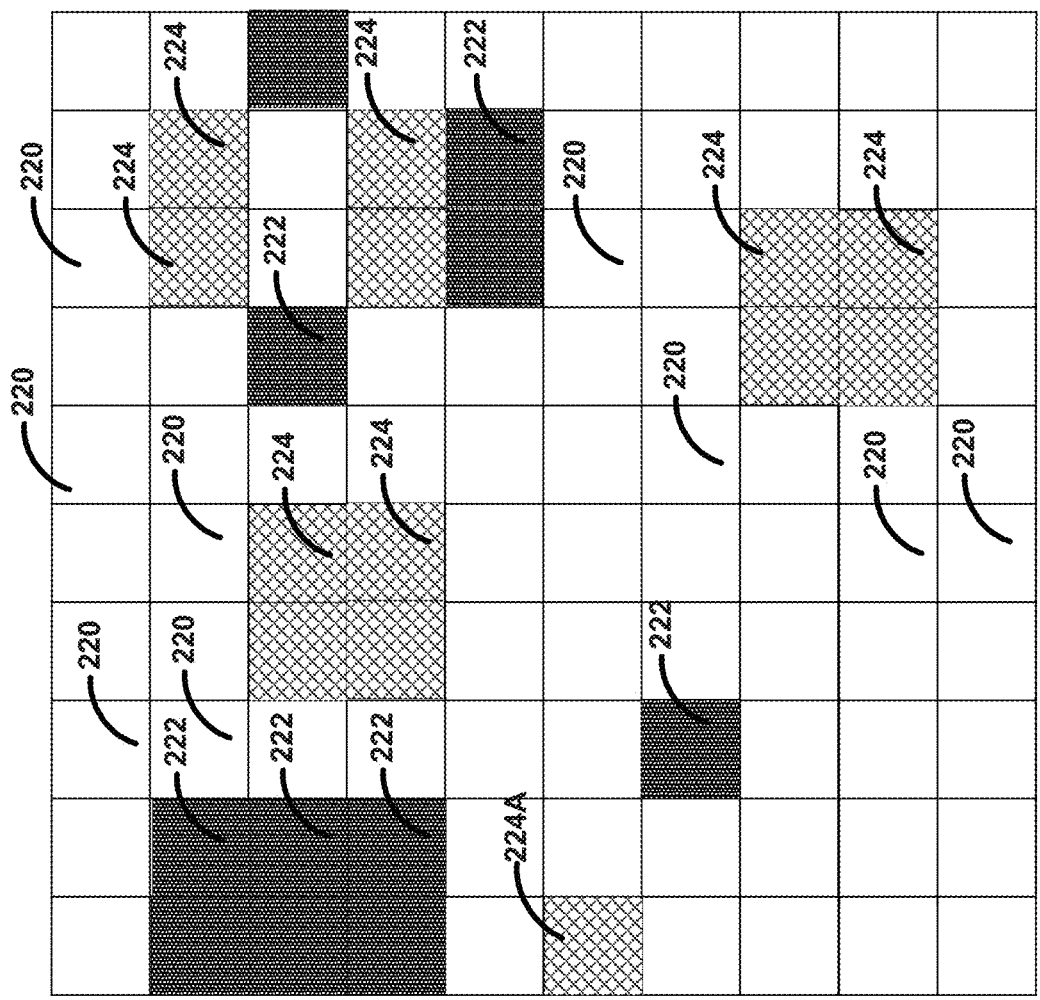
FIG. 3 illustrates, by way of example, a diagram of an embodiment of an SV grid that illustrates the SV grid at a next epoch.
Figure 3:
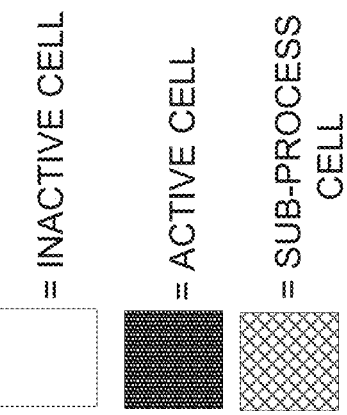

FIG. 3 illustrates, by way of example, a diagram of an embodiment of an SV grid 300 that illustrates the SV grid 200 at a next epoch. The SV grid 300 assumes that sub-process cells 224 are considered active cells 222 for applying the rules 1-5. In the example of FIG. 3, all rules are applied simultaneously. Then, when the next user data 102 is received, the active cells 222 and inactive cells 220 are updated so that the cyber chaff 110 can be different from the previous epoch.

Note that additional or alternative rules can be used in place of the ones discussed. The rule set can alter which cells are inactive and active in each epoch.

For seeding the SV grid 200, a random process or deterministic, random-like process can be used. For each cell, a value can be generated. The generated value can be compared to a threshold and the values relation to the threshold (e.g., greater than, less than, or equal) determines whether the cell is active or inactive. The sub-process cells 224 can be determined based on historical knowledge. For example, a sub-process can have a specified call that includes series of bits or bytes that is the same every time. These bits or bytes can be mapped to a cell of the SV grid 200. The cell or cells to which the data of the call maps can be made a sub-process cell 224.

Figure 4:
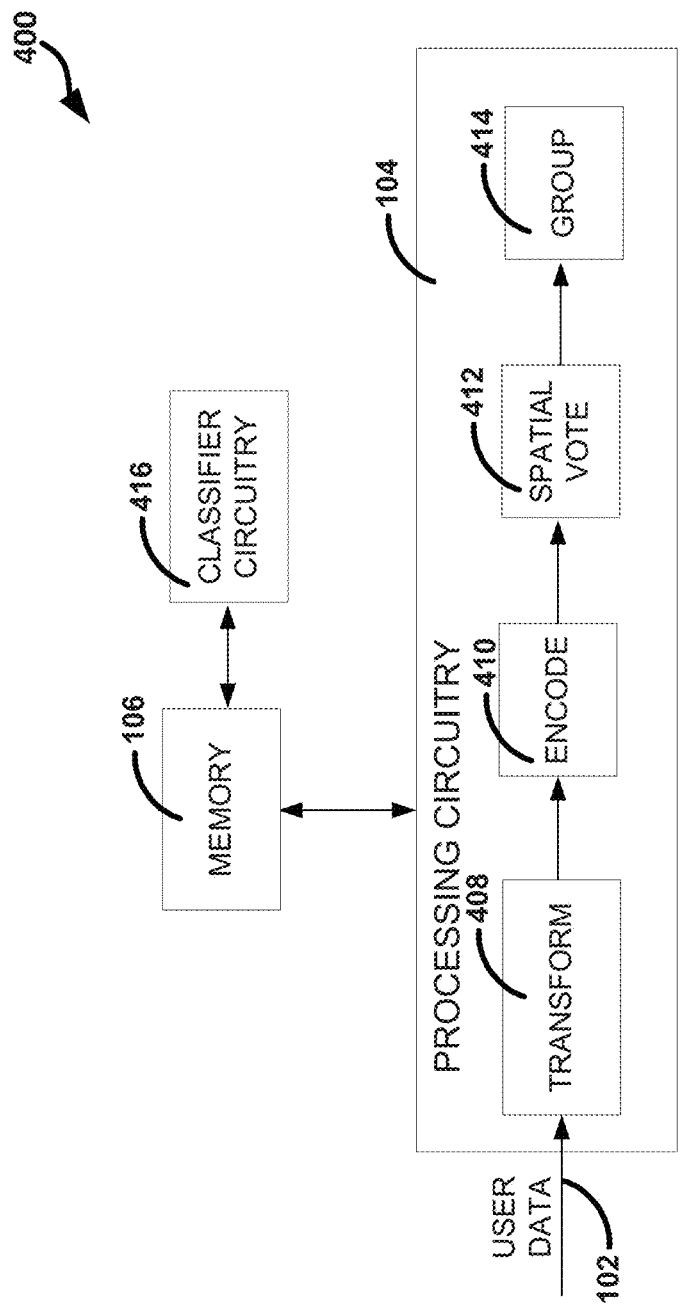
FIG. 4 illustrates, by way of example, a diagram of an embodiment of a system for SV.

FIG. 4 illustrates, by way of example, a diagram of an embodiment of a system 400 for spatial voting, such as can be part of the SV circuitry 114. The system 400 as illustrated includes the processing circuitry 104, classifier circuitry 416, and the memory 106. The processing circuitry 104 can identify a cell to which the user data 102 maps. The classifier circuitry 416 can present a detected anomaly (user data 102 mapped to a cell that has not had an input mapped thereto before now) to a user for action, adjust SV grid parameters, or the like. The memory 106 can store key values, SV grid parameters, or other data input or output from the processing circuitry 104.

The processing circuitry 104 receives the user data 102. The user data 102 can include binary data, text, signal values, image values, or other data that can be transformed to a number. The processing circuitry 104 can transform the user data 102 to a number, at operation 408. The operation 408 can include encoding the input into a specified format, parsing the data into chunks (e.g., chunks of a specified size), or the like. For example, the operation 408 can include encoding text input to an American Standard Code for Information Interchange (ASCII) encoding to transform the user data 102 into numbers between zero (0) and two hundred fifty-five (255). In another example, the operation 408 can include converting chunks of binary data to their numerical equivalent, such as two's complement, unsigned integer, floating number (e.g., short or long), or the like. In yet another example, the operation 408 can include performing an analog to digital conversion on analog signal data, such as by an analog to digital converter. In yet another example, the operation 408 can include combining red, green, blue (RGB) values of a color image, or the like, to generate a number. Not all the user data 102 needs to be transformed, thus the operation 408 is optional.

The processing circuitry 104 can receive numbers either as raw user data 102 or from the operation 408 and encode the numbers into two features (discussed below) at operation 410. The operation 410 is order-sensitive, such that the same inputs received in a different order encode (likely encode) to different features.

Examples of features include RM, RS, SM, SS, TM, TS, OC1, OC2, and OCR (discussed below). These calculations are performed in the sequence shown so that they can be calculated in a single pass across the data element where a value derived by an earlier step is used in an antecedent step directly and all calculations are updated within a single loop. RM can be determined using Equation 1:

$$RM_i = (RM_{i-1} + X_i)/2 \qquad \text{Equation 1}$$

In Equation 1, $X_i$ is the ith input value for i=1, 2 ... n.

RS can be determined using Equation 2:

$$RS_i = \left(RS_{i-1} + \sqrt{\frac{(X_i - RM_i)^2}{2}}\right)/2 \qquad \text{Equation 2}$$

SM can be determined using Equation 3:

$$SM_i = \Sigma X_i/n \qquad \text{Equation 3}$$

SS can be determined using Equation 4:

$$SS_i = \sqrt{(SS_{i-1} + (X_i - SM_i)^2)/(n-1)} \qquad \text{Equation 4}$$

TM can be determined using Equation 5:

$$TM_i = (TM_{i-1} + SM_{i-1})/2 \qquad \text{Equation 5}$$

TS can be determined using Equation 6:

$$TS_i = \left(TS_{i-1} + \sqrt{\frac{(X_i - TM_i)^2}{2}}\right)/2 \qquad \text{Equation 6}$$

Orthogonal component 1 (OC1) can be determined using Equation 7:

$$OC1_i = (RM_i + SM_i + TM_i)/3 \qquad \text{Equation 7}$$

Orthogonal component 2 (OC2) can be determined using Equation 8:

$$OC2_i = (RS_i + SS_i + TS_i)/3 \qquad \text{Equation 8}$$

Orthogonal component rollup (OCR) can be determined using Equation 9:

$$OCR_i = OC1_i + OC2_i \qquad \text{Equation 9}$$

There is no "best" encoding for all use cases (Ugly Duckling Theorem limitation). Each set of encoding features used as (x, y) pairs will yield a different but valid view of the same data, with each sensitive to a different aspect of the same data. "R" features tend to group and pull together, "S" features tend to spread out, "T" features tend to congeal data into fewer groups, but sub groups tend to manifest with much more organized structure, and "OC" features tend to produce the most general spread of data. "OC" features most resemble PC1 and PC2 of traditional Principal Component Analysis (PCA) without the linear algebra for eigenvectors.

Each feature is now described in more detail with suggested application:

R-type feature—Associates data into closer, less spread groups, guaranteed to be bounded in SV data space if the encoding is bounded and the SV space is similarly bounded (e.g., if ASCII encoding is used and the x and y extent are bounded from [000]-[255]). R-type features are recommended when the dynamic variability in data is unknown (typically initial analysis). This can be refined in subsequent analysis. R-type features will tend to group data more than other features.

S-type feature—Tends to spread the data out more. How the encoded data spreads can be important, so things that stay together after spreading are more likely to really be similar. S-type features produce a potentially unbounded space. S-type features tend to spread data along one spatial grid axis more than another. Note, if the occupied cells in the SV spatial grid fall along a 45-degree line, then the 2 chosen stat types are highly correlated and are describing the same aspects of the data. When this occurs, it is generally suggested that one of the compressive encoding features be changed to a different one.

T-type feature—These compressive encoding features are sensitive to all changes and are used to calculate running mean and running sigma exceedances. T-type features can provide improved group spreading over other features types. T-type features tend to spread data along both axes.

OC-type feature—Orthogonal Components, which are simple fast approximations to PCA (Principal Component Analysis). The OC1 component is the average of RM, SM, and TM, OC2 is the average of RS, SS, and TS, and OCR is the sum of OC1 and OC2.

Note that while two variants of each type of feature are provided (e.g., RS and RM are each a variant of an R-type feature) cross-variants can provide a useful analysis of data items. For example, if an RS or RM is used as feature 1, any of the S-type features, T-type features, or OC-type features can also be used as feature 2. Further, two of the same features can be used on different data. For example, TS on a subset of columns of data from a row in a comma separated values (CSV) data file can form a feature 1, while TS on the same row of data but using a different subset of columns can form a feature 2.

In some embodiments, one or more features can be determined based on length of a corresponding data item. The length-based features are sometimes called LRM, LRS, LSM, LSS, etc.

The features of Equations 1-9 are order-dependent. The features can be plotted against each other on a grid of cells, at operation 412. The processing circuitry 104 can initialize an SV grid to which the encoded inputs are mapped, such as at operation 412.

Plotted values can be associated or correlated, such as at operation 414. The operation 414 can include forming groups of mapped inputs and determining an extent thereof. More details regarding the operations 408-414 are provided in FIGS. 5-7.

The classifier circuitry 416 can provide a user with a report indicating behavior that is anomalous. An input mapped to a cell that was not previously populated is considered anomalous. If an input is mapped to a cell that already has an input mapped thereto by the features, the input can be considered recognized or known. Since some applications can be memory limited, an entity can opt to have few cells in an SV grid. For these cases, it can be beneficial to determine an extent that an encoded value is situated away from a center of a cell. If the encoded value is a specified distance away from the center or a center point (e.g., as defined by a standard deviation, variance, confidence ellipse, or the like), the corresponding data item can be considered anomalous. Such embodiments allow for anomaly detection in more memory-limited devices.

The classifier circuitry 416, in some embodiments, can indicate in the report that an input known to be malicious was received. The report can include the input, the group (if applicable) to which the cell is a member, a number of consecutive inputs, a last non-anomalous data item, a subsequent non-anomalous data-item, such as for behavioral analysis or training, or the like. The classifier circuitry 416 can indicate, in the report, different types of anomalies. For example, a type 1 anomaly can indicate a new behavior that falls within an area of regard (AOR). A type 2 anomaly can indicate a new behavior that falls outside of an area of regard. An area of regard can be determined based on one or more prior anomaly detection epochs. In a given epoch, there can be one or more areas of regard. An anomaly detection epoch is a user-defined interval of analyzing a number of inputs, a time range, or the like. The epoch can be defined in the memory 816 and monitored by the processing circuitry 104.

In some embodiments, an event for the report can include a single anomalous behavior. In some embodiments, an event for the report can be reported in response to a specified threshold number of type 2 anomalies.

The classifier circuitry 416 can adjust SV grid parameters. An initial size of an SV grid cell can be determined. In some embodiments, the initial size of the SV grid cell can include dividing the space between (0, 0) and the encoded (x, y) of the first input data item into an N×N SV grid, where N is the initial number of cells on a side of the SV grid (for example, a 16×16 SV grid would break up the distance in x and in y to the first data point from the origin into 16 equal divisions).

As new input data items are introduced and encoded, whenever one fall outside the extent of the SV grid, the N×N SV grid can be increased in size to (N+1)×(N+1) until either the new input data item is included on the resized SV grid, or N becomes equal to the maximum allowed number of SV grid cells on a side of the SV grid. After N becomes a defined maximum SV grid size (for example 64×64), and a new input data item falls off of the current SV grid, the size of each SV grid cell size can be increased so that the SV grid encompasses the new data point.

As either the number of SV grid cells on a side or the overall extent of the SV grid in x and y are increased to encompass new input data items, the SV grid column (Equation 14), SV grid row (Equation 15), and key index value (Equation 16) can be changed to map the populated SV grid cells from the previous SV grid to the newly size one. To accomplish this, the center (x, y) value of each populated SV grid cell can be calculated using the minimum and maximum x and y values and the number of SV grid cells in the previous SV grid, and then mapping the centers and their associated SV grid counts onto the new SV grid using Equations 14, 15, and 16. This is done using the following equations:

$$\text{Row} = \text{int}(\text{Key Value}/(\text{number of cells on side})) \quad \text{Equation 10}$$

$$\text{Col} = \text{Key Value} - \text{int}(\text{Row} * (\text{number of cells on side})) \quad \text{Equation 11}$$

$$\text{Center 1} = x\ \text{min} + \text{Col} * (x\ \text{range})/(\text{num. col}-1) \quad \text{Equation 12}$$

$$\text{Center 2} = y\ \text{min} + \text{Row} * (y\ \text{range})/(\text{num. row}-1) \quad \text{Equation 13}$$

The values for Center 1 and Center 2 can then be used in Equations 14, 15, and 16 (below) as Feature 1 and Feature 2 to calculate the new Key Value for each populated cell on the new SV grid.

Figure 5:
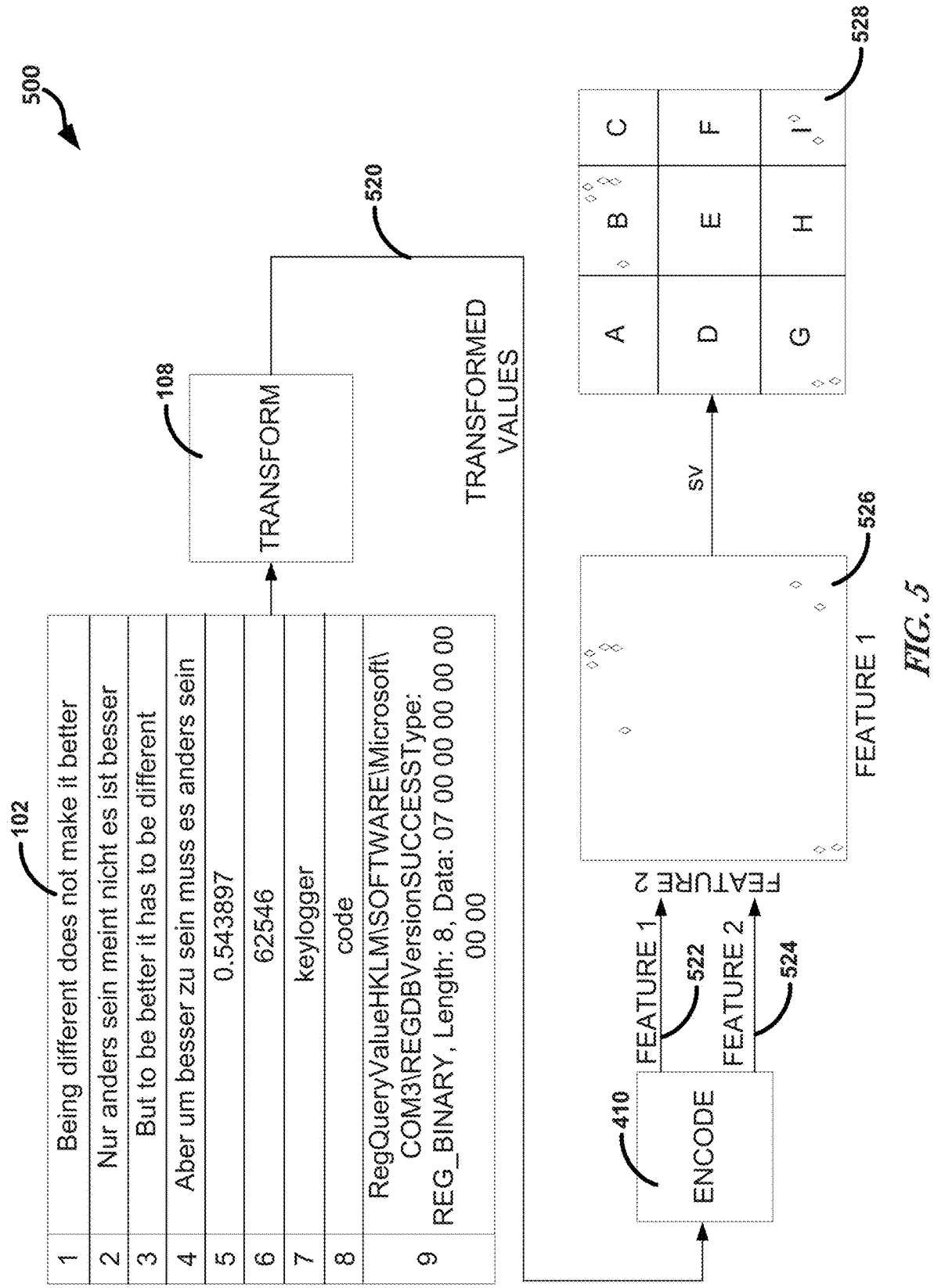
FIG. 5 illustrates, by way of example, a diagram of an embodiment of a method for SV.

FIG. 5 illustrates, by way of example, a diagram of an embodiment of a method 500 for identifying an anomalous behavior. The method 500 as illustrated includes receiving the user data 102. The user data 102 in FIG. 5 includes nine text strings labelled "1"-"9". Each of the text strings "1"-"9" of the user data 102 is respectively transformed to transformed values 520 at operation 408. An example transformation is ASCII encoding which transforms text to numerical values. The transformed values 520 can be used to perform the operation 410. The operation 410 can include determining two features 522, 524 of the user data 102 and plotting them against each other to form a feature graph 526. The features 522, 524 can include, for example, RM, RS, SM, SS, TM, and TS, in some embodiments.

Consider the input data item "1". Each character of the input data item "1" can be transformed to an ASCII value. The features can be determined based on the ASCII encoding of the entire string. That is, $X_i$ is the ASCII value of each character and the features are determined over all ASCII encodings of the characters of the input data item "1". As an example, the resultant RM can be feature 1 522 and the resultant RS can be feature 2 524, or vice versa. This is merely an example and any order-dependent feature can be chosen for feature 1 and any order-dependent feature chosen for feature 2. Each of the input data items "1"-"9" can be processed in this manner at operation 408 and 410.

The graph 526 can then be split into cells to form a grid 528. The cells of FIG. 5 are labelled "A"-"I" for illustration (Key Values are numeric labels of the SV grid cells from Equation 16). User data 102 mapped to a same cell can be considered similar. User data 102 mapped to an empty cell can be considered anomalous. In the grid 528, input data items "1"-"4" (sentences in English and German) are mapped to cell "B", input data items 5-6 (numbers) are mapped to cell "I", and input data items "7-8" (words) are mapped to cell "G". Input data item 9, which is a combination of words, numbers, and other characters, maps to cell "B" indicating that input data item "9" is more like a sentence than a word or number. If a subsequent user data 102 were to be received and mapped to cell "A", "C", "D", "E", "F", or "H" it can be deemed anomalous, as it is a behavior that has not been received before and is sufficiently different from other behaviors that have been seen previously.

As can be seen, whether an input is considered an anomaly is dependent on a size of a cell. The size of the cell can be chosen or configured according to an operational constraint, such as a size of a memory, compute bandwidth, or the like. The size of a cell can be chosen or configured according to a desired level of security. For example, a higher level of security can include more cells, but require more memory and compute bandwidth to operate, while a lower level of security can include fewer cells but require less memory and bandwidth to operate.

Figure 6:
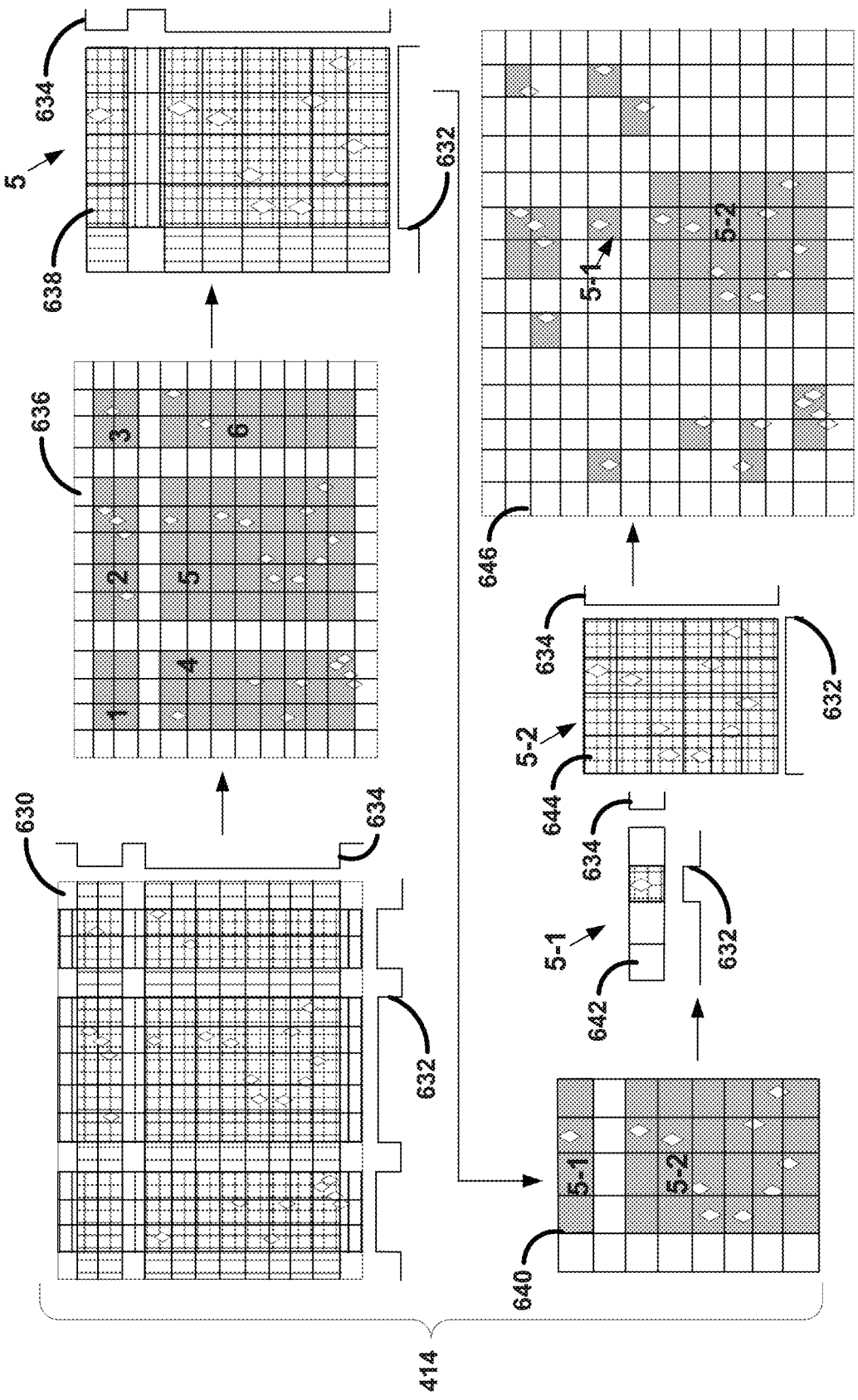
FIG. 6 illustrates, by way of example, a diagram of an embodiment of a grouping operation.

FIG. 6 illustrates, by way of example, a diagram of an embodiment of the operation 414. Encoded inputs ((x, y) points) are represented by diamonds. The operation 414 (sometimes called shadowing for group extraction) can include an iterative process that identifies cells that are populated and aggregates and separates those cells into groups. The iterative process can include:

1) Identifying cells of columns with at least one populated cell at operation 632 (indicated by horizontal hashing in graph 630)
2) Identifying cells of rows with at least one populated cell at operation 634 (indicated by vertical hashing in graph 630)
3) For each cell identified at both (1) and (2) (indicated by cross-hashing in the cell), (a) aggregate with all contiguous cells identified at both (1) and (2), (b) assign aggregated cells to a group, and (c) label the group with a key
4) Repeat (1)-(3) for each group/sub-group until no change.

A graph 636 illustrates the result of a first iteration of performing the operations (1)-(3). After the first iteration, six groups "1"-"6" in FIG. 6 are formed. Next each of the groups "1"-"6" are processed by operations (1)-(3). In FIG. 6, the second iteration is illustrated for group "5". The operations 632 and 634 can be performed on a sub-grid 638 formed by the cells of group "5". A graph 640 illustrates the result of the second iteration of performing the operations (1)-(3). After a second iteration on group "5", two subgroups "5-1" and "5-2" are formed in the example of FIG. 6.

In the example of FIG. 6, a third iteration of the operations (1)-(3) is performed on the subgroups "5-1" and "5-2". The operations 632 and 634 can be performed on sub-grids 642, 644 formed by the cells of sub-groups "5-1" and "5-2". A graph 646 illustrates the result of the performing all iterations of the operations (1)-(3) and the groups formed therefrom.

In some embodiments, the number of cells can be adaptive, such as to be adjusted during runtime as previously discussed. Related to this adaptive cell size is determining the location of an encoded input in the grid and a corresponding key value associated with the encoded input. An example of determining the location in the grid includes using the following equations (for an embodiment in which feature 1 is plotted on the x-axis and feature 2 is plotted on the y-axis):

$$\text{Col} = \text{int}((\text{feature 1} - x\ \text{min}) * (\text{num. col}-1)/(x\ \text{range})) \quad \text{Equation 14}$$

$$\text{Row} = \text{int}((\text{feature 2} - y\ \text{min}) * (\text{num. row}-1)/(y\ \text{range})) \quad \text{Equation 15}$$

An encoding on the grid, sometimes called key value, can be determined using Equation 16:

$$\text{Key Value} = \text{num. row} * \text{Row} + \text{Col} \quad \text{Equation 16}$$

The "x min", "y min", "x max", and "y max" can be stored in the memory 106. Other values that can be stored in the memory 106 and relating to the grid of cells include "max grid size", "min grid size", or the like. These values can be used by the processing circuitry 104 to determine "x range", "num. col.", "y range", or "num. row", such as to assemble the grid of cells or determine a key value for a given encoded input (e.g., (feature 1, feature 2)).

A series of key values representing sequential inputs can be stored in the memory 106 and used by the classifier circuitry 416, such as to detect malicious (not necessarily anomalous) behavior. A malicious or other behavior of interest can be operated on by the processing circuitry 104 and the key values of the behavior can be recorded. The key values can be stored and associated with the malicious behavior. Key values subsequently generated by the processing circuitry 104 can be compared to the key values associated with the malicious behavior to detect the malicious behavior in the future.

Figure 7:
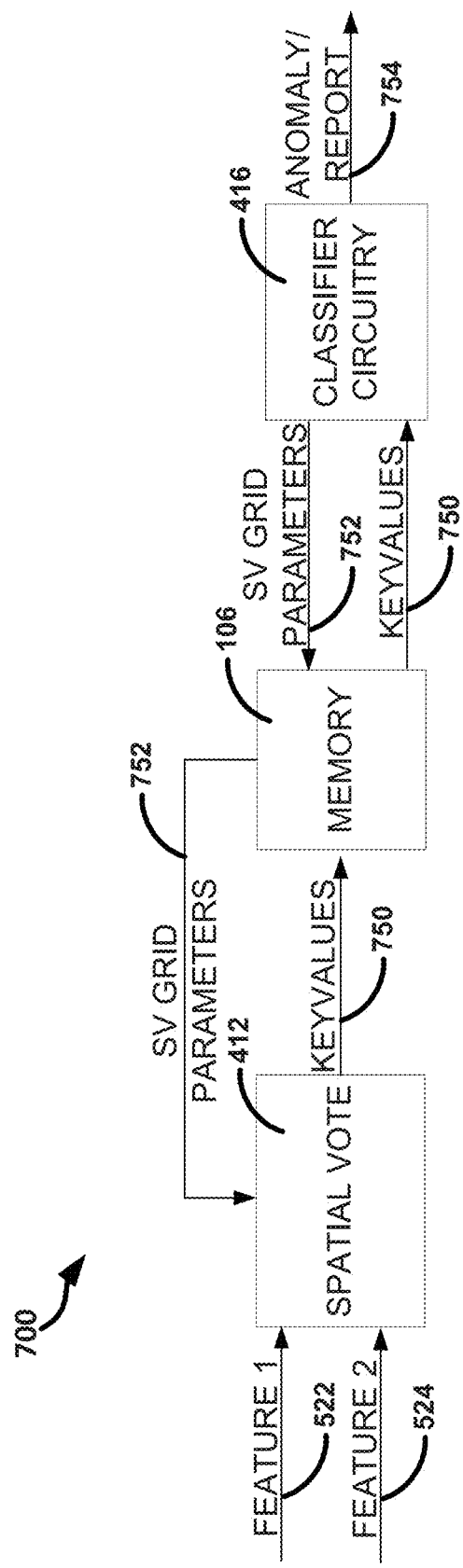
FIG. 7 illustrates, by way of example, a diagram of an embodiment of a system for SV.

FIG. 7 illustrates, by way of example, a diagram of an embodiment of a system 700 for spatial voting. The system 700 includes an exploded view diagram of a portion of the system 400. The system 700 as illustrated includes the operation 412 of the processing circuitry 104, the memory 106, and classifier circuitry 416. The operation 412 determines key values 750 based on SV grid parameters 752 from the memory 106 and features 522, 524 determined by the processing circuitry 104.

The key values in the memory 106 can allow for F-testing, t-testing, or Z-score analysis, such as by the classifier circuitry 416. These analyses can help identify significant columns and cells. The classifier circuitry 416 can provide event and pre-event logs in a report 754, such as for further analysis. The report 754 can provide information on which column or cell corresponds to the most different behavior.

Figure 8:
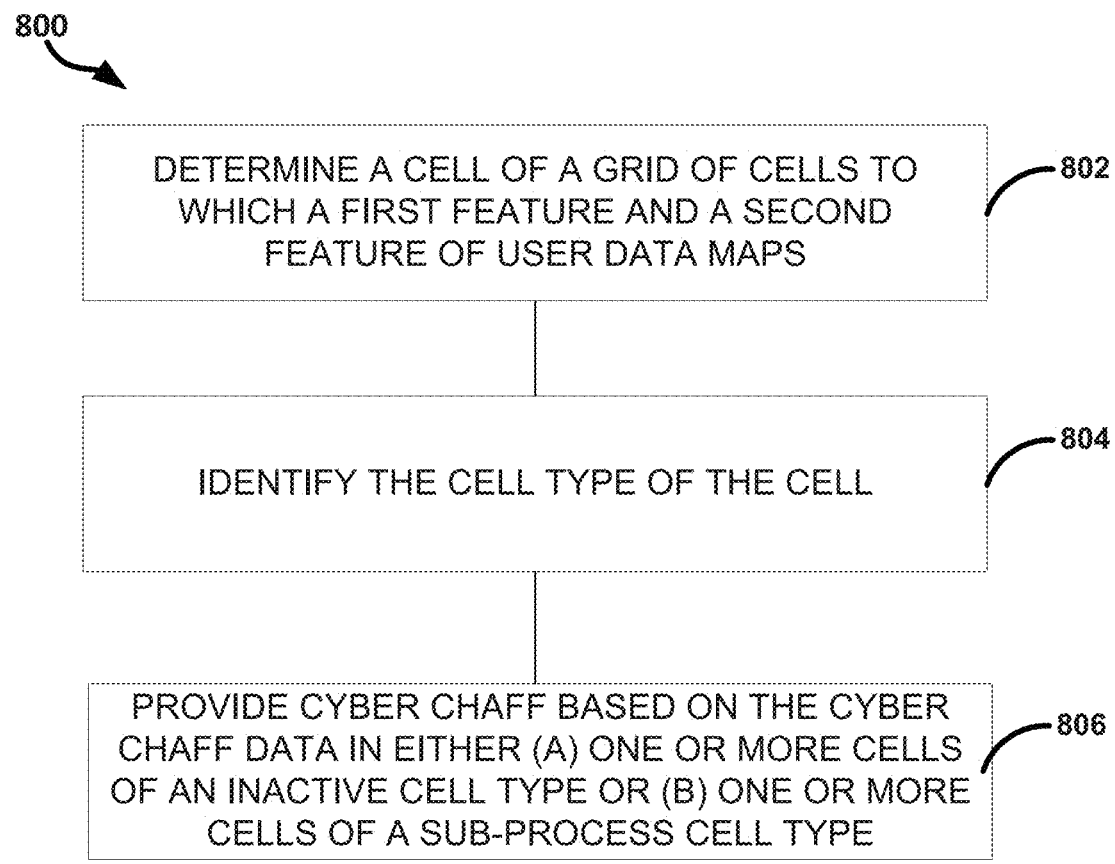
FIG. 8 illustrates, by way of example, a diagram of an embodiment of a method for generating cyber chaff.

FIG. 8 illustrates, by way of example, a diagram of an embodiment of a method 800 for generating cyber chaff. The cyber chaff can include cyber chaff data associated with one or more cells of an SV grid. The method 800 as illustrated includes determining a cell of the grid of cells to which a first feature and a second feature of user data maps, at operation 802; identifying the type of the cell, at operation 804; and providing cyber chaff based on the cyber chaff data in either (a) one or more cells of an inactive cell type or (b) one or more cells of a sub-process cell type, at operation 806. The method 800 can further include altering a type of one or more cells of the inactive cell type and one or more cells of the active cell type based on a number of cells contiguous with the cell that are of the active cell type.

The method 800 can further include, in response to identifying the type of the cell is an active cell or inactive cell type, provide data from one or more of the active cells in the cyber chaff. The method 800 can further include, in response to identifying the type of the cell is a sub-process cell, provide data from the sub-process cell in the cyber chaff. The method 800 can further include, in response to identifying the type of the cell is a sub-process cell, provide data from other contiguous cells of the sub-process cell type in the cyber chaff.

The method 800 can further include, wherein the grid of cells is one of a plurality of grids of cells. The method 800 can further include data indicating, for each grid of cells, a program identification indicating a process. The method 800 can further include determining a second process associated with the user data and determining a cell of the grid of cells associated with a process that matches the second process to which a first feature and a second feature of user data maps.

The method 800 can further include, for each cell of a sub-process cell type, data indicating a data format that defines an arrangement of the data of the cyber chaff. The method 800 can further include arranging the data from the sub-process cell types or the active cell types in conformance with the defined arrangement.

Figure 9:
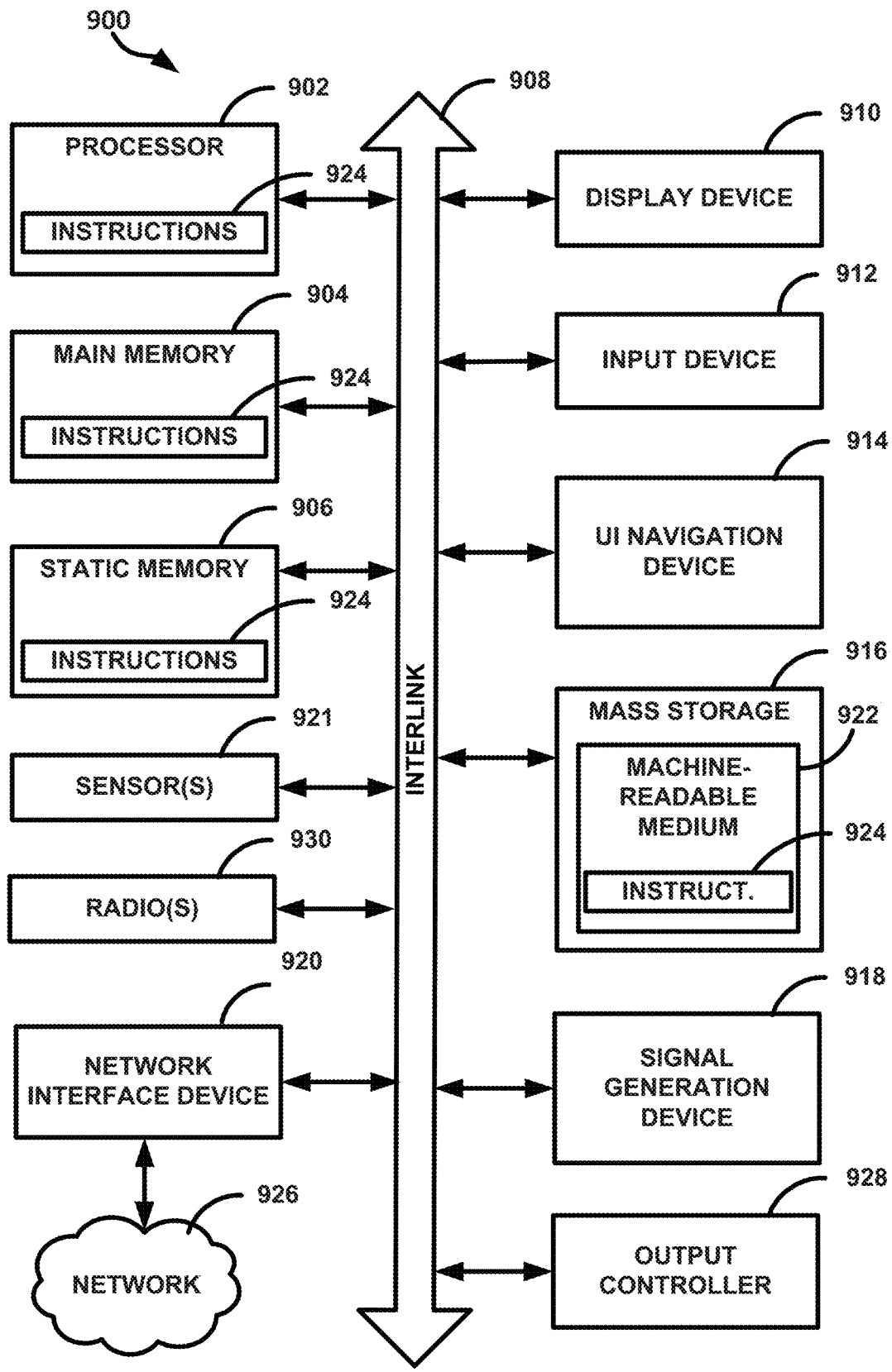
FIG. 9 illustrates, by way of example, a block diagram of an embodiment of a machine on which one or more of the methods, such as those discussed about FIGS. 1-8 and elsewhere herein can be implemented.

FIG. 9 illustrates, by way of example, a block diagram of an embodiment of a machine 900 on which one or more of the methods, such as those discussed about FIGS. 2-8 and elsewhere herein can be implemented. In one or more embodiments, the system 100 can be implemented by the machine 1400. In alternative embodiments, the machine 900 operates as a standalone device or may be connected (e.g., networked) to other machines. In a networked deployment, the machine 1400 may operate in the capacity of a server or a client machine in server-client network environment, or as a peer machine in a peer-to-peer (or distributed) network environment. The machine 900 may be a personal computer (PC), a tablet PC, a set-top box (STB), a Personal Digital Assistant (PDA), a cellular telephone, a web appliance, a network router, switch or bridge, embedded computer or hardware, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 900 includes processing circuitry 902 (e.g., a hardware processor, such as can include a central processing unit (CPU), a graphics processing unit (GPU), an application specific integrated circuit, circuitry, such as one or more transistors, resistors, capacitors, inductors, diodes, logic gates, multiplexers, oscillators, buffers, modulators, regulators, amplifiers, demodulators, or radios (e.g., transmit circuitry or receive circuitry or transceiver circuitry, such as RF or other electromagnetic, optical, audio, non-audible acoustic, or the like), sensors 921 (e.g., a transducer that converts one form of energy (e.g., light, heat, electrical, mechanical, or other energy) to another form of energy), or the like, or a combination thereof), a main memory 904 and a static memory 906, which communicate with each other and all other elements of machine 900 via a bus 908. The transmit circuitry or receive circuitry can include one or more antennas, oscillators, modulators, regulators, amplifiers, demodulators, optical receivers or transmitters, acoustic receivers (e.g., microphones) or transmitters (e.g., speakers) or the like. The RF transmit circuitry can be configured to produce energy at a specified primary frequency to include a specified harmonic frequency.

The machine 900 (e.g., computer system) may further include a video display unit 910 (e.g., a liquid crystal display (LCD) or a cathode ray tube (CRT)). The machine 900 also includes an alphanumeric input device 912 (e.g., a keyboard), a user interface (UI) navigation device 914 (e.g., a mouse), a disk drive or mass storage unit 916, a signal generation device 918 (e.g., a speaker) and a network interface device 920.

The mass storage unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processing circuitry 902 during execution thereof by the machine 900, the main memory 904 and the processing circuitry 902 also constituting machine-readable media. One or more of the main memory 904, the mass storage unit 916, or other memory device can store the data for executing a method discussed herein.

The machine 900 as illustrated includes an output controller 928. The output controller 928 manages data flow to/from the machine 900. The output controller 928 is sometimes called a device controller, with software that directly interacts with the output controller 928 being called a device driver.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that can store, encode or carry instructions for execution by the machine and that cause the machine to perform any one or more of the methodologies of the present invention, or that can store, encode or carry data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of several well-known transfer protocols (e.g., hypertext transfer protocol (HTTP), user datagram protocol (UDP), transmission control protocol (TCP)/internet protocol (IP)). The network 926 can include a point-to-point link using a serial protocol, or other well-known transfer protocol. Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that can store, encode or carry instructions for execution by the machine, and includes digital or analog communications signals or other intangible media to facilitate communication of such software.

This disclosure can be understood with a description of some embodiments, sometimes called examples.

Example 1 can include a system for generating cyber chaff, the system comprising a memory including data indicating a grid size for a grid of cells, a number of cells in the grid of cells and for each cell, a cell type indicating whether the cell is an active cell, an inactive cell, or a sub-process cell, and cyber chaff data, processing circuitry coupled to the memory, the processing circuitry being configured to determine a cell of the grid of cells to which a first feature and a second feature of user data maps, identify the cell type of the cell, and provide cyber chaff based on the cyber chaff data in either (a) one or more cells of the inactive cell type or (b) one or more cells of the sub-process cell type.

In Example 2, Example 1 can further include, wherein the processing circuitry is further configured to alter a type of one or more cells of the inactive cell type and one or more cells of the active cell type based on a number of cells contiguous with the cell that are of the active cell type.

In Example 3, at least one of Examples 1-2 can further include, wherein the processing circuitry is further configured to, in response to identifying that the type of the cell is an active cell or inactive cell type, provide data from one or more of the active cells in the cyber chaff.

In Example 4, at least one of Examples 1-3 can further include, wherein the processing circuitry is further configured to, in response to identifying that the type of the cell is a sub-process cell, provide data from the sub-process cell in the cyber chaff.

In Example 5, at least one of Examples 1-4 can further include, wherein the processing circuitry is further configured to, in response to identifying the type of the cell is a sub-process cell, provide data from other contiguous cells of the sub-process cell type in the cyber chaff.

In Example 6, at least one of Examples 1-5 can further include, wherein the grid of cells is one of a plurality of grids of cells, the memory includes data indicating, for each grid of cells, a program identification indicating a process, and the processing circuitry is further configured to determine a second process associated with the user data and determine a cell of the grid of cells associated with a process that matches the second process to which a first feature and a second feature of user data maps.

In Example 7, at least one of Examples 1-6 can further include, wherein the memory further includes, for each cell of a sub-process cell type, data indicating a data format that defines an arrangement of the data of the cyber chaff and wherein the processing circuitry is further configured to arrange the data from the sub-process cell types or the active cell types in conformance with the defined arrangement.

Example 8 includes a non-transitory machine-readable medium including instructions that, when executed by a machine, configure the machine to perform operations comprising determining a cell of a grid of cells to which a first feature and a second feature of user data maps, identifying a cell type of the cell, the cell type indicating whether the cell is an active cell, an inactive cell, or a sub-process cell, and providing cyber chaff based on cyber chaff data associated with either (a) one or more cells of the inactive cell type or (b) one or more cells of the sub-process cell type.

In Example 9, Example 8 can further include, wherein the operations further include altering a type of one or more cells of the inactive cell type and one or more cells of the active cell type based on a number of cells contiguous with the cell that are of the active cell type.

In Example 10, at least one of Examples 8-9 can further include, wherein the operations further include, in response to identifying that the type of the cell is an active cell or inactive cell type, providing data from one or more of the active cells in the cyber chaff.

In Example 11, at least one of Examples 8-10 can further include, wherein the operations further include, in response to identifying that the type of the cell is a sub-process cell, providing data from the sub-process cell in the cyber chaff.

In Example 12, at least one of Examples 8-11 can further include, wherein the operations further include, in response to identifying the type of the cell is a sub-process cell, providing data from other contiguous cells of the sub-process cell type in the cyber chaff.

In Example 13, at least one of Examples 8-12 can further include, wherein the grid of cells is one of a plurality of grids of cells and each grid of cells is associated with a program identification indicating a process, and the operations further include determining a second process associated with the user data and determine a cell of the grid of cells associated with a process that matches the second process to which a first feature and a second feature of user data maps.

In Example 14, at least one of Examples 8-13 can further include, wherein each cell of a sub-process cell type is associated with data indicating a data format that defines an arrangement of the data of the cyber chaff, and the operations further include arranging the data from the sub-process cell types or the active cell types in conformance with the defined arrangement.

Example 15 includes a method comprising determining a cell of a grid of cells to which a first feature and a second feature of user data maps, identifying a cell type of the cell, the cell type indicating whether the cell is an active cell, an inactive cell, or a sub-process cell, and providing cyber chaff based on cyber chaff data associated with either (a) one or more cells of the inactive cell type or (b) one or more cells of the sub-process cell type.

In Example 16, Example 15 can further include altering a type of one or more cells of the inactive cell type and one or more cells of the active cell type based on a number of cells contiguous with the cell that are of the active cell type.

In Example 17, at least one of Examples 15-16 can further include, in response to identifying that the type of the cell is an active cell or inactive cell type, providing data from one or more of the active cells in the cyber chaff.

In Example 18, at least one of Examples 15-17 can further include, in response to identifying that the type of the cell is a sub-process cell, providing data from the sub-process cell in the cyber chaff.

In Example 19, at least one of Examples 15-18 can further include, in response to identifying the type of the cell is a sub-process cell, providing data from other contiguous cells of the sub-process cell type in the cyber chaff.

In Example 20, at least one of Examples 15-19 can further include, wherein the grid of cells is one of a plurality of grids of cells and each grid of cells is associated with a program identification indicating a process, and the method further includes determining a second process associated with the user data and determine a cell of the grid of cells associated with a process that matches the second process to which a first feature and a second feature of user data maps.

In Example 21, at least one of Examples 15-20 can further include, wherein each cell of a sub-process cell type is associated with data indicating a data format that defines an arrangement of the data of the cyber chaff, and the operations further include arranging the data from the sub-process cell types or the active cell types in conformance with the defined arrangement.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for generating cyber chaff, the system comprising:

a memory including data indicating a grid size for a grid of cells, a number of cells in the grid of cells and for each cell, a cell type indicating whether the cell is an active cell or an inactive cell, and a cell sub-type indicating whether the cell is a sub-process cell, and cyber chaff data that emulates a response expected by a user, the sub-process cell associated with an operation to be performed on cyber chaff data;

processing circuitry coupled to the memory, the processing circuitry being configured to:

determine a cell of the grid of cells to which a first feature and a second feature of user data of the user maps;

identify the cell type of the cell to which the first feature and the second feature maps;

provide cyber chaff using the operation defined by a most recent sub-process cell to which the first feature and the second feature mapped and operating, using the operation, on the cyber chaff data in one or more of (a) one or more cells of the active cell type or (b) one or more cells of the sub-process cell sub-type to generate the cyber chaff; and after providing the cyber chaff, altering a type of one or more cells of the inactive cell type and one or more cells of the active cell type based on a number of cells contiguous with the cell that are of the active cell type, the cells of the sub-process sub-type are further considered cells of the active cell type.

2. The system of claim 1, wherein the processing circuitry is further configured to after providing the cyber chaff, retain the cells of the sub-process cell sub-type as sub-process cells.

3. The system of claim 1, wherein the processing circuitry is further configured to, in response to identifying that the type of the cell is an active cell or inactive cell type, provide the cyber chaff data from one or more of the active cells as the cyber chaff.

4. The system of claim 1, wherein the processing circuitry is further configured to, in response to identifying that the sub-type of the cell is a sub-process cell, provide the cyber chaff data from the sub-process cell as the cyber chaff.

5. The system of claim 1, wherein the processing circuitry is further configured to, in response to identifying the sub-type of the cell is a sub-process cell, provide the cyber chaff data from other contiguous cells of the sub-process cell sub-type as the cyber chaff.

6. The system of claim 1, wherein:

the grid of cells is one of a plurality of grids of cells;

the memory includes data indicating, for each grid of cells, a program identification indicating a process; and the processing circuitry is further configured to determine a second process associated with the user data and determine a cell of the grid of cells associated with a process that matches the second process to which a first feature and a second feature of user data maps.

7. The system of claim 1, wherein the memory further includes, for each cell of a sub-process cell sub-type, data indicating a data format that defines an arrangement of the data of the cyber chaff and wherein the processing circuitry is further configured to arrange the data from the sub-process cell sub-types or the active cell types in conformance with the defined arrangement.

8. A non-transitory machine-readable medium including instructions that, when executed by a machine, configure the machine to perform operations comprising:

determining a cell of a grid of cells to which a first feature and a second feature of user data of a user maps;

identifying a cell type of the cell to which the first feature and the second feature maps, the cell type indicating whether the cell is an active cell or an inactive cell, and a cell sub-type indicating whether the cell a sub-process cell, the active and inactive cells associated with cyber chaff data that emulates a response expected by the user, and the sub-process cells associated with an operation to be performed on cyber chaff data;

operating, using the operation, on cyber chaff data associated with at least one of (a) one or more cells of the active cell type or (b) one or more cells of the sub-process cell sub-type using the operation defined by a most recent sub-process cell to which the first feature and the second feature mapped to generate cyber chaff;

providing the cyber chaff; and after providing the cyber chaff, altering a type of one or more cells of the inactive cell type and one or more cells of the active cell type based on a number of cells contiguous with the cell that are of the active cell type, the cells of the sub-process sub-type are further considered cells of the active cell type.

9. The non-transitory machine-readable medium of claim 8, wherein the operations further include retaining the cells of the sub-process sub-type as sub-process cells.

10. The non-transitory machine-readable medium of claim 8, wherein the operations further include, in response to identifying that the type of the cell is an active cell or inactive cell type, providing the cyber chaff data from one or more of the active cells as the cyber chaff.

11. The non-transitory machine-readable medium of claim 8, wherein the operations further include, in response to identifying that the sub-type of the cell is a sub-process cell, providing the cyber chaff data from the sub-process cell as the cyber chaff.

12. The non-transitory machine-readable medium of claim 8, wherein the operations further include, in response to identifying the sub-type of the cell is a sub-process cell, providing the cyber chaff data from other contiguous cells of the sub-process cell sub-type as the cyber chaff.

13. The non-transitory machine-readable medium of claim 8, wherein:
the grid of cells is one of a plurality of grids of cells and each grid of cells is associated with a program identification indicating a process; and
the operations further include determining a second process associated with the user data and determine a cell of the grid of cells associated with a process that matches the second process to which a first feature and a second feature of user data maps.

14. The non-transitory machine-readable medium of claim 8, wherein:
each cell of a sub-process cell sub-type is associated with data indicating a data format that defines an arrangement of the data of the cyber chaff; and
the operations further include arranging the data from the sub-process cell sub-types or the active cell types in conformance with the defined arrangement.

15. A method comprising:
determining a cell of a grid of cells to which a first feature and a second feature of user data of a user maps;
identifying a cell type of the cell to which the first feature and the second feature maps, the cell type indicating whether the cell is an active cell or an inactive cell, and a cell sub-type indicating whether the cell is a sub-process cell, the active and inactive cells associated with cyber chaff data that emulates a response expected by the user, and the sub-process cells associated with an operation to be performed on cyber chaff data;
operating on cyber chaff data associated with at least one of (a) one or more cells of the active cell type or (b) one or more cells of the sub-process cell sub-type using the operation defined by a most recent sub-process cell to which the first feature and the second feature mapped to generate cyber chaff;
providing the cyber chaff; and
after providing the cyber chaff, altering a type of one or more cells of the inactive cell type and one or more cells of the active cell type based on a number of cells contiguous with the cell that are of the active cell type, the cells of the sub-process sub-type are further considered cells of the active cell type.

16. The method of claim 15, further comprising retaining the cells of the sub-process sub-type as sub-process cells.

17. The method of claim 15, further comprising, in response to identifying that the type of the cell is an active cell or inactive cell type, providing the cyber chaff data from one or more of the active cells as the cyber chaff.

18. The method of claim 15, further comprising, in response to identifying that the sub-type of the cell is a sub-process cell, providing the cyber chaff data from the sub-process cell as the cyber chaff.

19. The method of claim 15, further comprising, in response to identifying the sub-type of the cell is a sub-process cell, providing the cyber chaff data from other contiguous cells of the sub-process cell sub-type as the cyber chaff.

20. The method of claim 15, wherein:
the grid of cells is one of a plurality of grids of cells and each grid of cells is associated with a program identification indicating a process; and
the method further includes determining a second process associated with the user data and determine a cell of the grid of cells associated with a process that matches the second process to which a first feature and a second feature of user data maps.

* * * * *